US010923986B2

(12) United States Patent
Baker et al.

(10) Patent No.: US 10,923,986 B2
(45) Date of Patent: Feb. 16, 2021

(54) MAGNETIC ANTI-LOCK DEVICE

(71) Applicant: DBB TECHNOLOGY LLC, Springfield, MO (US)

(72) Inventors: David Brian Baker, Springfield, MO (US); Sam Bryan Williams, Marshfield, MO (US)

(*) Notice: Subject to any disclaimer, the term of this patent is extended or adjusted under 35 U.S.C. 154(b) by 162 days.

(21) Appl. No.: 16/009,855

(22) Filed: Jun. 15, 2018

(65) Prior Publication Data

US 2018/0367009 A1    Dec. 20, 2018

Related U.S. Application Data

(60) Provisional application No. 62/603,874, filed on Jun. 15, 2017.

(51) Int. Cl.

| H02K 7/02 | (2006.01) |
|---|---|
| H02K 7/00 | (2006.01) |
| H01F 7/02 | (2006.01) |
| H02K 49/10 | (2006.01) |
| H02K 7/14 | (2006.01) |
| H02K 29/03 | (2006.01) |

(52) U.S. Cl.
CPC .............. *H02K 7/003* (2013.01); *H01F 7/02* (2013.01); *H02K 7/14* (2013.01); *H02K 49/102* (2013.01); *H02K 29/03* (2013.01)

(58) Field of Classification Search
CPC ........ H02K 7/003; H02K 7/14; H02K 49/102; H02K 29/03; H01F 7/02
See application file for complete search history.

(56) References Cited

U.S. PATENT DOCUMENTS

| 5,342,825 A * | 8/1994 | Iannello | F16C 32/0438 |
| | | | 310/52 |
| 6,337,872 B1 * | 1/2002 | Nara | H01S 3/036 |
| | | | 372/57 |
| 2010/0270885 A1 * | 10/2010 | Izquierdo | H02K 53/00 |
| | | | 310/152 |

* cited by examiner

*Primary Examiner* — Emily P Pham
(74) *Attorney, Agent, or Firm* — Dale J. Ream (57) ABSTRACT

A magnetic anti-lock device for a rotating shaft is described. The magnetic anti-lock device utilizes opposing magnets to reduce the varying force required to rotate the shaft and increases efficiency of the rotating shaft. The magnetic anti-lock device includes at least one inner magnet attached to the rotating shaft, and at least one outer magnet fixed in position relative to the rotating shaft. The inner magnet passes the outer magnet each time the shaft rotates creating a repulsive force to reduce the force necessary to rotate the shaft.

20 Claims, 10 Drawing Sheets

MAGNETIC ANTI-LOCK DEVICE

CROSS-REFERENCE TO RELATED APPLICATIONS

This application claims the benefit of U.S. Provisional Patent Application Ser. No. 62/603,874 filed Jun. 15, 2017, the disclosure of which is incorporated herein by reference.

BACKGROUND

Field of the Invention

This disclosure is in the field of anti-lock devices for rotating shafts. More specifically, this disclosure is in the field of magnetic anti-lock devices. More specifically, this disclosure is in the field of magnetic anti-lock devices for use with magneto devices, generator devices, and other similar equipment.

In some applications, a shaft is rotated to drive a piece of equipment such as magneto, a generator, or other similar devices. The devices driven by the rotating shaft may generate a variable resistance or workload as the shaft is rotated to drive the device. As the force required to turn the shaft varies, the shaft may become deadlocked or become very difficult to rotate due to the varying force required to do so. This may be especially noticeable at low rates of rotation.

For example, a magneto may be used to generate voltage to operate a spark plug in a small motor. The force required to turn the magneto may vary depending on the relative position of the magnets in the magneto and the coils with which the magnets interact to generate electricity. Once the motor is operating and the flywheel component of the magneto is spinning, the variable force required for the magneto to turn may be acceptable. However, during a pull-start of the motor, a user may have difficulty operating the pull-start due to the varying high resistance of turning the magneto.

Even during normal operation, the varying resistance and resistive force reduces efficiency during normal operation of the devices.

The magnetic anti-lock device described herein counteracts some of the variable force required to turn the device such as the magneto, and thus makes the device more efficient and easier for use in some situations such as a pull-start motor.

SUMMARY OF THE INVENTION

In various embodiments, the invention described herein comprises an anti-lock device for a rotating shaft with at least one inner magnet attached to the rotating shaft, and at least one outer magnet held in a fixed position relative to the rotating shaft. The poles of the inner magnets and the outer magnets are positioned so that when each of the inner magnets passes by each of the outer magnets on each revolution of the rotating shaft a repulsive force exists between the each of the inner magnets and each of the outer magnet.

In some embodiments, the anti-lock device has at least three inner magnets and has at least three outer magnets. In some embodiments, the anti-lock device may also be provided with an inner ring fixed to the rotating shaft to which the inner magnets are attached.

In some embodiments, the anti-lock device of also has an outer ring having a socket for receiving the outer magnets. In some embodiments, each of the outer magnets is adjustably attached to the outer ring to allow the separation between each of the inner magnets and the outer magnets to be adjusted. In preferred embodiments, the inner end of each of the outer magnets includes a tapered section. One embodiment of the tapered section is a frusto-conical section. Another embodiment of tapered section is opposed bevels aligned with the direction of rotation of the at least one inner magnets.

In embodiments, the positions of the inner magnets and the magnets are selected so that each of the inner magnets is repelled by the outer magnets when the variable rotational resistance of the load device is at an increased resistance.

In some embodiments, the socket is a threaded socket; and each of the outer magnets is disposed in a threaded member received by one of the threaded sockets.

In additional embodiments, the separation between the inner magnets and the outer magnets may be adjusted by turning the threaded member to advance or retract the threaded member from the threaded socket.

In an additional embodiment, the anti-lock device is used with a rotating shaft used to power a load device, the anti-lock device comprising an inner ring attached to the rotating shaft such that the inner ring rotates with the shaft, a first inner magnet, a second inner magnet, and a third inner magnet attached to the inner ring, a second ring attached to the load device in a fixed relationship to the rotating shaft, a first outer magnet, a second outer magnet, and a third outer magnet attached to the outer ring. When the inner ring rotates with the rotating shaft, the like magnetic poles of each of the outer magnets exerts a repulsive force on each of the inner magnets as the inner magnets pass by the outer magnets. The like magnetic poles of the inner magnets and the outer magnets extend outwardly from the inner ring and inwardly from the outer ring, respectively.

In some embodiments, the inner magnets are disposed on the inner ring with their like poles extending outwardly from the shaft and with 120 degrees of arc separation from the other inner magnets. Similarly, in some embodiments, the outer magnets are disposed on the outer ring with their like poles extending inwardly toward the shaft and with 120 degrees of arc separation from the other outer magnets.

In the various embodiments, the outer magnets are aligned with the load device such that when one of the outer magnets repels one of the inner magnets, the repulsive force counteracts a portion of the load of the load device.

DETAILED DESCRIPTION

The magnetic anti-lock device 100 does not replace traditional bearings and bushings but helps overcome periodic resistance during the rotation of shaft 102 that might cause it to slow or stop altogether. Some load devices that are operated by a rotating shaft, such as a magneto or a generator, generate variable resistance to the rotation of the rotating drive shaft. This variable resistance may be due to the interaction of the internal components of the load device, such as interaction of the coil and magnets in a generator, or the armature, coils, and magnets in a magneto.

The locations of maximum resistance to rotation of the drive shaft may be determined based on the internal configuration of the load device, or simply be measuring the torque required to cause the rotating shaft to rotate and operate the load device. The anti-lock device described herein is aligned to the variable resistance of the load device to overcome some of the resistance of the load device at those maximum points by using repulsive magnetic forces.

As described in more detail below, the anti-lock device comprises inner magnets that are attached to and spin with the rotating shaft and outer magnets that are fixed in relation to the rotating shaft. Each one of the inner magnets passes close to each of the outer magnets once during each revolution of the rotating shaft. The poles of the inner and outer magnets are oriented such that as the two magnets pass close to each other, they repel one another. The points of repulsive force from the inner and outer magnets are timed (via the positioning of the magnets with respect to the variable resistance of the load device) to coincide with the maximum resistance of the load device and to counteract a portion of the resistance of the load device.

The anti-lock device thus reduces the force required to rotate the shaft through the variable resistance of the load device. This prevents locking, and reduces the maximum power requirements for motors used to drive the load device by smoothing the overall resistance of the load device to rotation.

Figure 1:
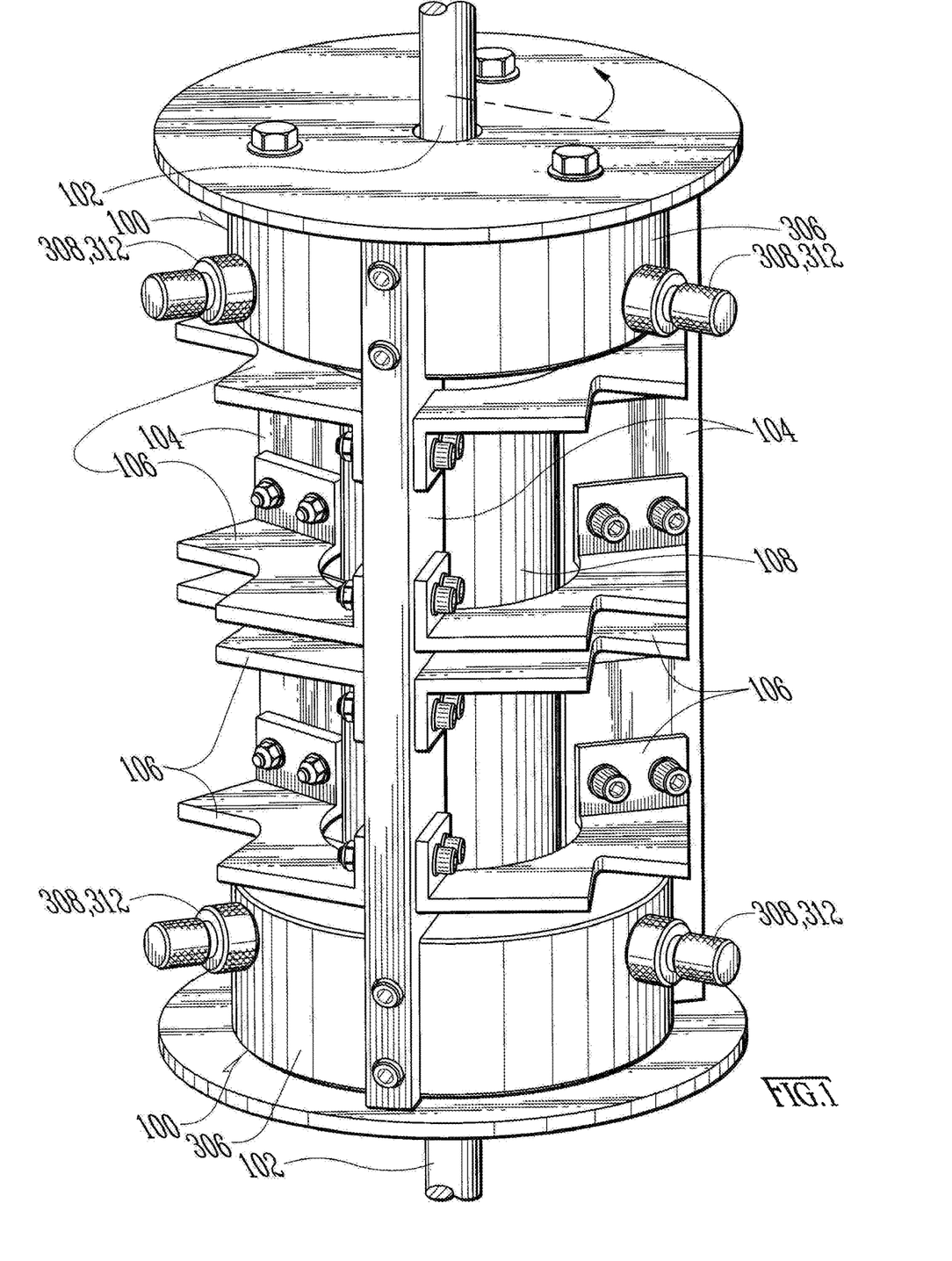
FIG. 1 is a perspective view of a device incorporating an embodiment of the inventive anti-lock device.
Figure 2:
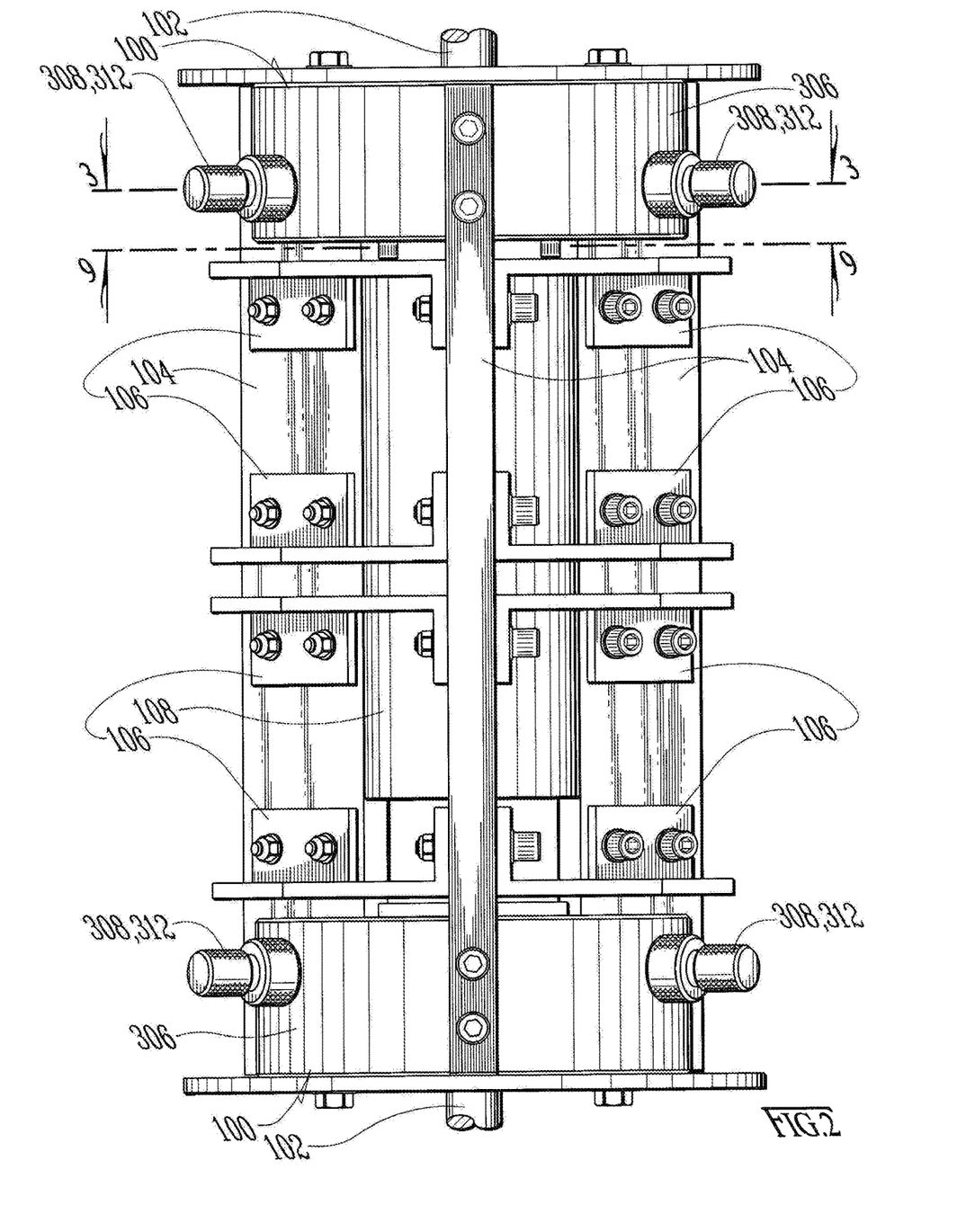
FIG. 2 is a side view of device incorporating an embodiment of the inventive anti-lock device.

Referring now to FIGS. 1 and 2, a perspective and a side view, respectively, of a device incorporating the inventive anti-lock device are depicted. The depicted anti-lock devices 100 are shown for use reducing rotational resistance for a rotating shaft 102. In the depictions in FIGS. 1 and 2, two of the magnetic anti-lock devices 100 are shown in use supporting the shaft 102.

In some applications a single magnetic anti-lock device 100 may be used with a shaft, or more than two magnetic anti-lock devices 100 may be used on the same shaft. The magnetic anti-lock devices 100 are supported by a structural frame that may vary from application to application and whose details are not limiting of the inventive device. In the depicted embodiments, the structure comprises plate members and beam members 104 to which the devices 100 are attached, and additional rib members 106 to provide additional support to the beam members 104. The depicted details of the plate, beam and rib members are not limiting of the claimed invention.

There may be traditional bearings or bushings securing shaft 102 within the structure and in relationship to the magnetic anti-lock device 100. In addition a generator, motor, or other device 108 may be attached to the shaft to power or to be powered by the rotation of shaft 102.

Figure 3:
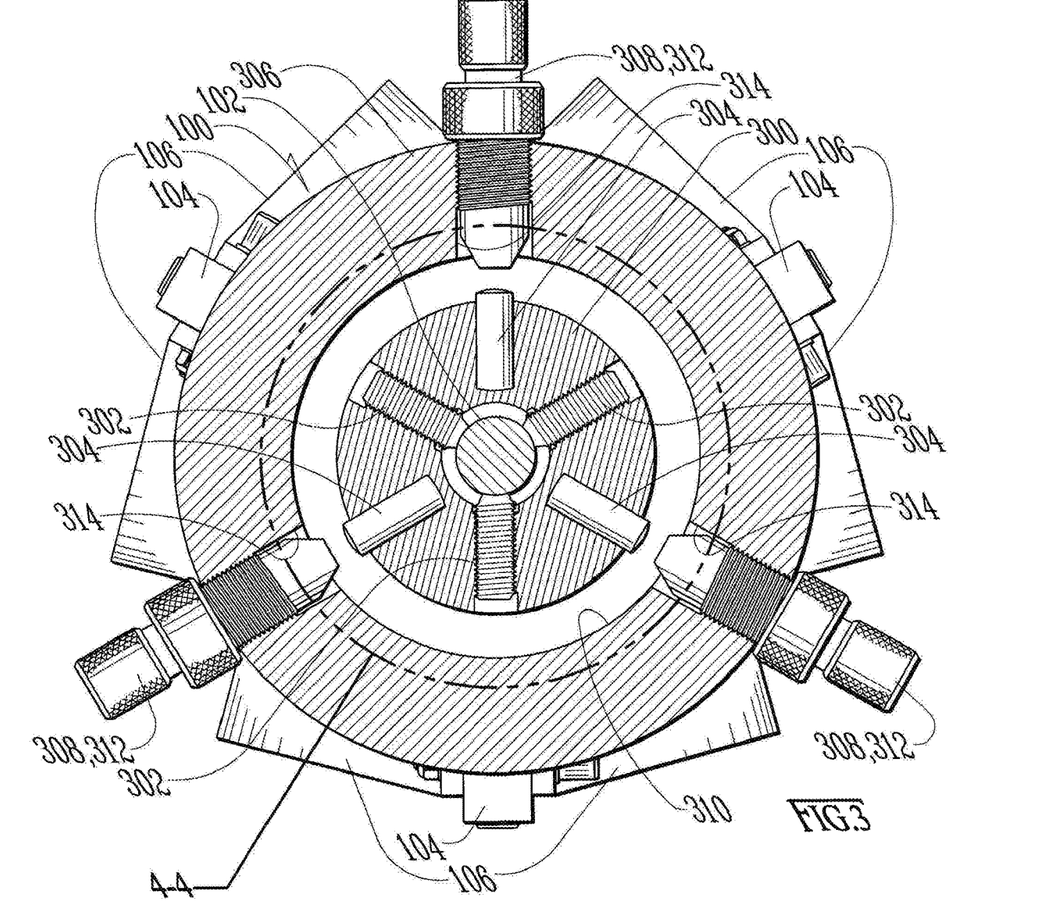
FIG. 3 is a cross-sectional view of an embodiment of the inventive anti-lock device.
Figure 4:
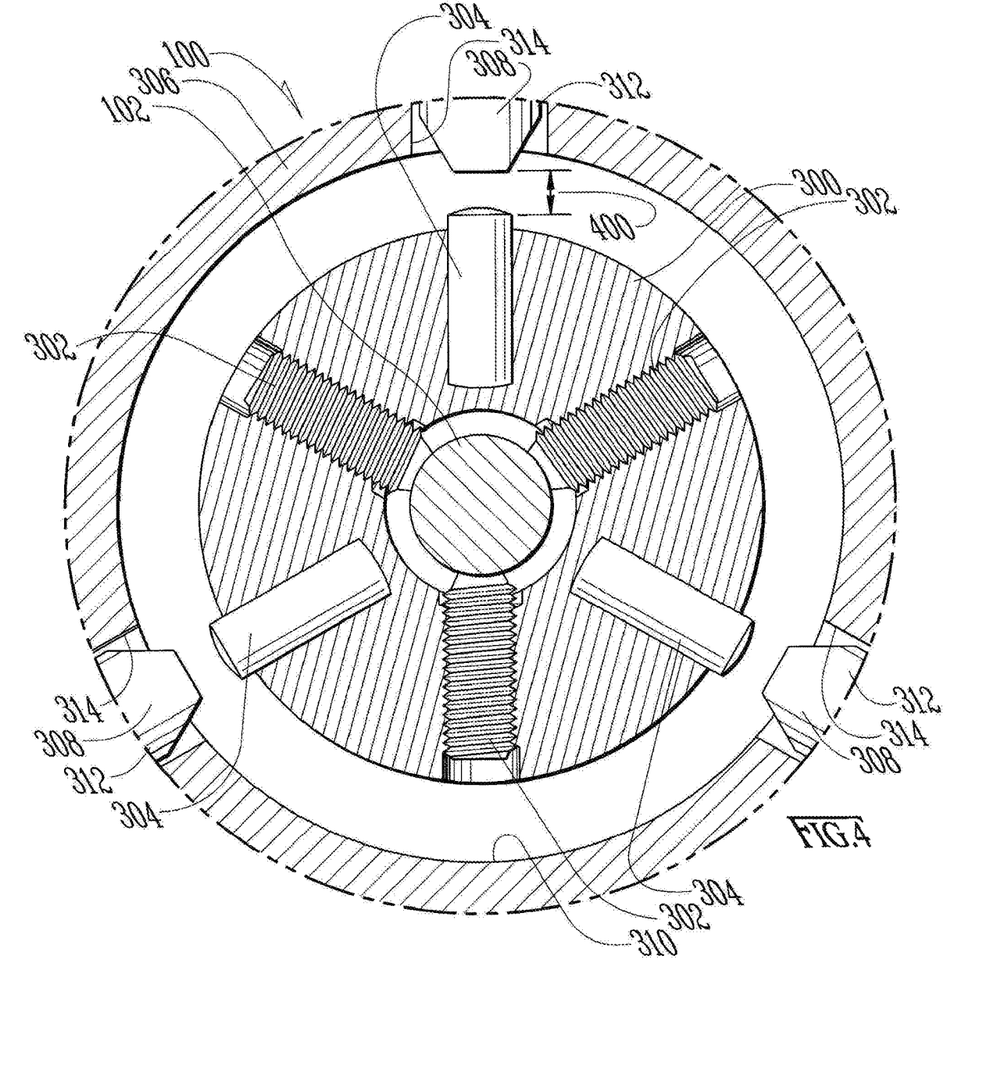
FIG. 4 is a detail cross-sectional view of a portion of an embodiment of the inventive anti-lock device.

Referring now to FIG. 3, a cross-sectional view of the inventive device 100 is depicted along the axis labeled as 3-3 on FIG. 2. FIG. 4 depicts a cross-sectional view of the portion of FIG. 3 in the dashed circle. Inner ring 300 is an annular ring provided for attachment to shaft 102. In the depicted embodiment, inner ring 300 is attached to shaft 102 by set screws 103. The use of three set screws allows the inner ring 300 to be securely fastened to shaft 102 with fine adjustment control to center and balance the shaft 102 within the inner ring 300. In some embodiments, the inner ring may be welded to the shaft, provided with a key to match a keyway in the shaft or vice versa, or attached in some other manner to the shaft. In some embodiments the inner ring 300 may be formed integrally with shaft 102. The inner ring 300 extends outwardly from the rotational axis of shaft 102.

The width of its outward extension may vary in embodiments of the invention, but must be sufficient to receive and secure at least one inner magnet members 304 in a desired relationship to outer ring 306. As shaft 102 rotates, inner ring 300 also rotates at the same rate. The depicted embodiment incorporates three inner magnets 304, but in other embodiments, more or fewer inner magnets 304 may be provided. In some embodiments the outward extension of the annular ring may not be uniform around the perimeter of the ring, but may vary as necessary for the components attached to it. The inner magnets are typically distributed around the inner ring in an equal manner to equally distribute the weight and rotationally balance the inner ring on the shaft. In the embodiment with three inner magnets, each of the three inner magnets is aligned with a ray extending outwardly from the center of the rotating shaft with 120 degrees of arc separating each magnet alignment with those of the other two magnets. In some embodiments the inner magnets have a pulling power of 65 lbs., though various embodiments may have different pulling power. Each inner magnet may consist of multiple smaller magnets placed together with opposite poles together.

An outer structural member is provided to support additional outer magnets 308. In the depicted embodiment, the outer structural member 306 is an annular ring that is fixedly attached to the structure to which the magnetic anti-lock device 100 is attached. At least one outer magnet 308 is provided in the outer ring 306. The outer magnets 308 are secured to the outer ring 308 so that one pole of the outer magnet extends inwardly from the inner surface 310 of the outer ring 308 toward the inner ring 300. The function of the outer ring 306 is to provide support to the outer magnets 308 in relation to the inner magnets 304.

In some embodiments of the device 100, the outer ring 306 may not be a solid ring but may have gaps, be formed from separate pieces affixed together, or include only sufficient portions as necessary to support the magnets 308 at the desired location and with the desired rigidity. In some embodiments, the magnets 308 might not be supported by a ring 306 but by a support structure of sufficient rigidity. Any such structure that supports magnets 308 at the necessary locations with respect to the inner magnets 304 may be an embodiment of the inventive device.

In the depicted embodiment, outer magnets 308 are attached to a member 312 which is received by a hole or socket 314 in outer ring 306. The outer magnets 308 may be affixed to the end of member 312 by glue or other means of attachment. In some embodiments, magnets 308 may be recessed into cavities in the end of member 312.

The outer magnets are typically distributed around the outer ring as necessary to cause the magnetic interactions between the inner and outer magnets to occur at the desired point in the rotation of the shaft. In the depicted embodiment with three outer magnets, each of the three outer magnets is aligned with a ray extending outwardly from the center of the rotating shaft with 120 degrees of arc separating each magnet alignment with those of the other two magnets. In some embodiments of the device, additional outer magnets may be distributed around the outer ring as necessary to match the load characteristics of the shaft rotation. In some embodiments two additional outer magnets, equally spaced apart, may be disposed between the three outer magnets shown in the figures.

In some embodiments of the device, the outer magnets have from 130 to 195 lbs. of pulling power. In some embodiments, not all of the outer magnets have the same pulling power. In some embodiments, the two additional magnets may have half of the pulling power of the three outer magnets shown in the figures. The outer magnets may each be formed from smaller magnets placed with opposite poles together to form one larger magnet.

Figure 5:
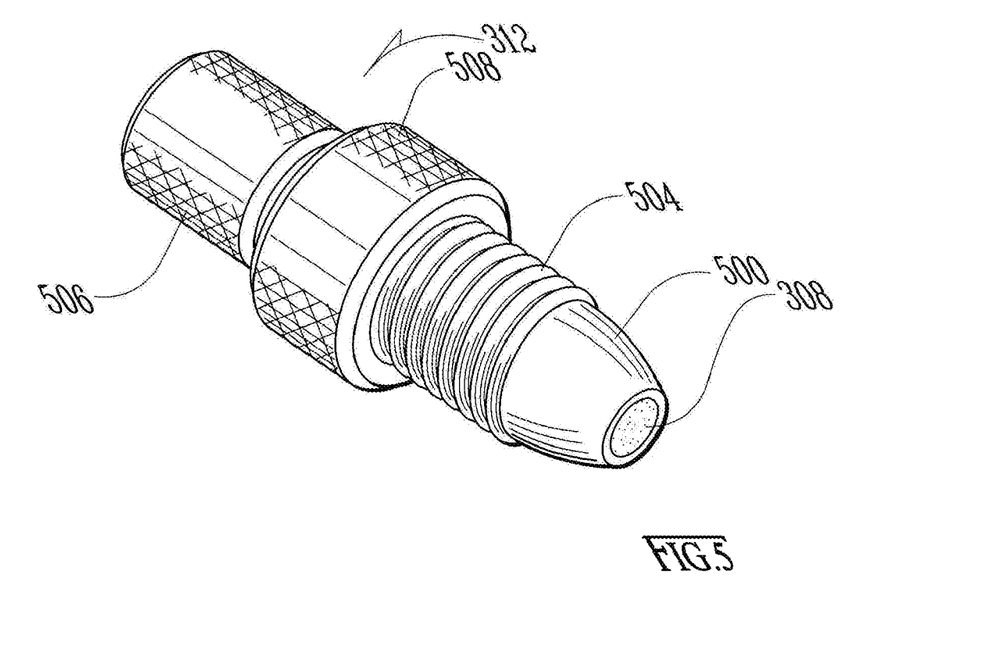
FIG. 5 is a perspective view of an embodiment of a portion of the inventive anti-lock device.

In some embodiments of the member 312 the magnet is shaped to improve performance by creating a desired magnetic field. Referring now to FIG. 5 a perspective view of an embodiment of the member 312 is depicted. In this embodiment, the inner end of the magnet 308 tapers as it approaches the inner end of the member 312. The tapered section of magnet 308 may be shaped in a variety of shapes to create a desired magnetic field that gradually increases the repulsive force between the two magnets. Without the tapered section, an abrupt increase in magnetic repulsion between the inner and outer magnets that would reduce the functionality of the anti-lock device. In the first depicted embodiment, the magnet 308 has a frusto-conical section 500 that provides the taper but has a flat circular end surface 502.

Grip portion 506 allows a user to adjust the position of the magnet 308 in relation to magnet 304 by turning the member 312 and advancing or retracting it in the socket 314 in outer ring 306. A locking ring or nut 508 may be provided for locking the member 312 in place when it is adjusted to a desired position. The locking ring 508 may be rotated on the threads 504 until it is secured against the outer surface of outer ring 306, thus locking member 312 in place with respect to outer ring 306. The member is also provided with screws 504 for engaging the threads in the socket 314 in outer ring 306.

Figure 6:
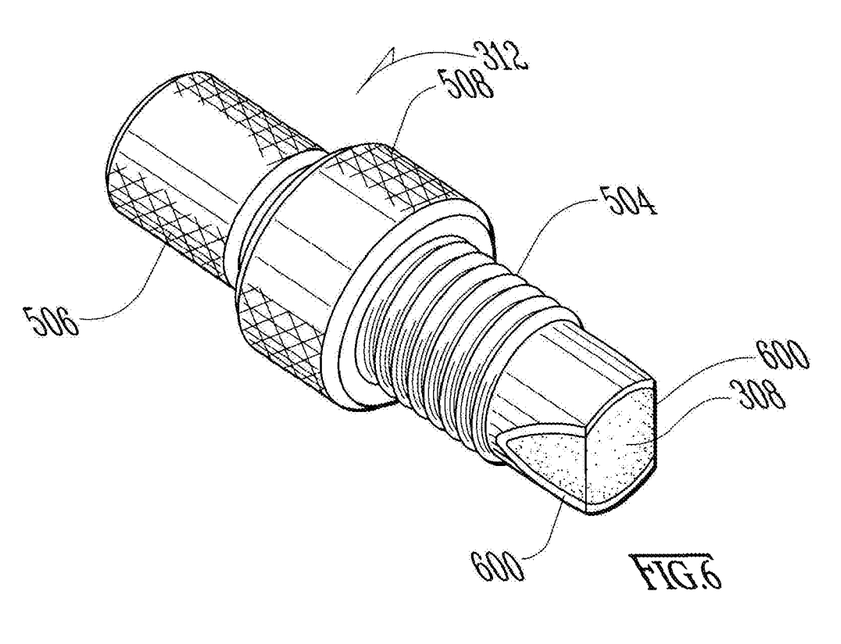
FIG. 6 is a perspective view of an embodiment of a portion of the inventive anti-lock device.

In another embodiment of member 312 depicted in FIG. 6, the magnet 308 has two bevels 600 disposed on opposite sides of magnet 308. The opposed bevels also serve to shape the magnetic field created by magnet 308 into a desired shape. In this embodiment, an indicia of the location of the bevels is provided on grip 506 so that a user may align the bevels 600 with the direction of rotation of the inner magnets 304 when it is disposed into socket 314.

In the depicted embodiment, member 312 is a threaded bolt. In other embodiments, member 312 may not be a bolt or cylindrical, but may be other shapes within the scope of the inventive device. In the depicted embodiment, hold 314 is threaded to receive threads on bolt 312. In embodiments with the threaded hole and bolt, the bolt 312 may be advanced into the hole to adjust the separation or gap 400 between inner magnets 304 and outer magnets 308. The threading also allows the adjustment of the orientation of the outer magnet 308 with respect to the rotation of the inner ring 300.

As shaft 102 rotates due to the operation of the device 108 or other part of the system, the inner ring 300 will rotate, causing inner magnets 304 to pass in close proximity to outer magnets 310. The magnets 304 and 310 are oriented so that the like poles of each magnet will come into close proximity thus causing the outer magnets 308 to repel the inner magnets 304, and vice versa.

Figure 7:
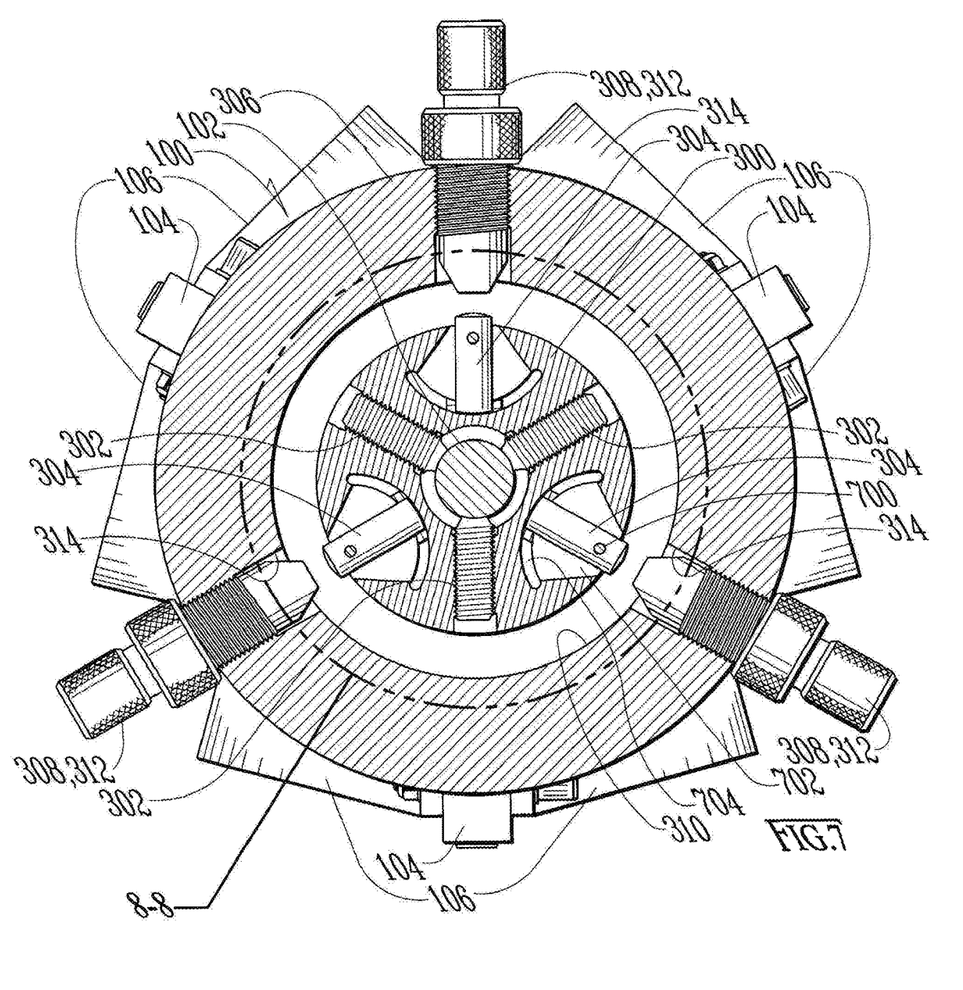
FIG. 7 is a cross-sectional view of an alternative embodiment of the inventive anti-lock device.
Figure 8:
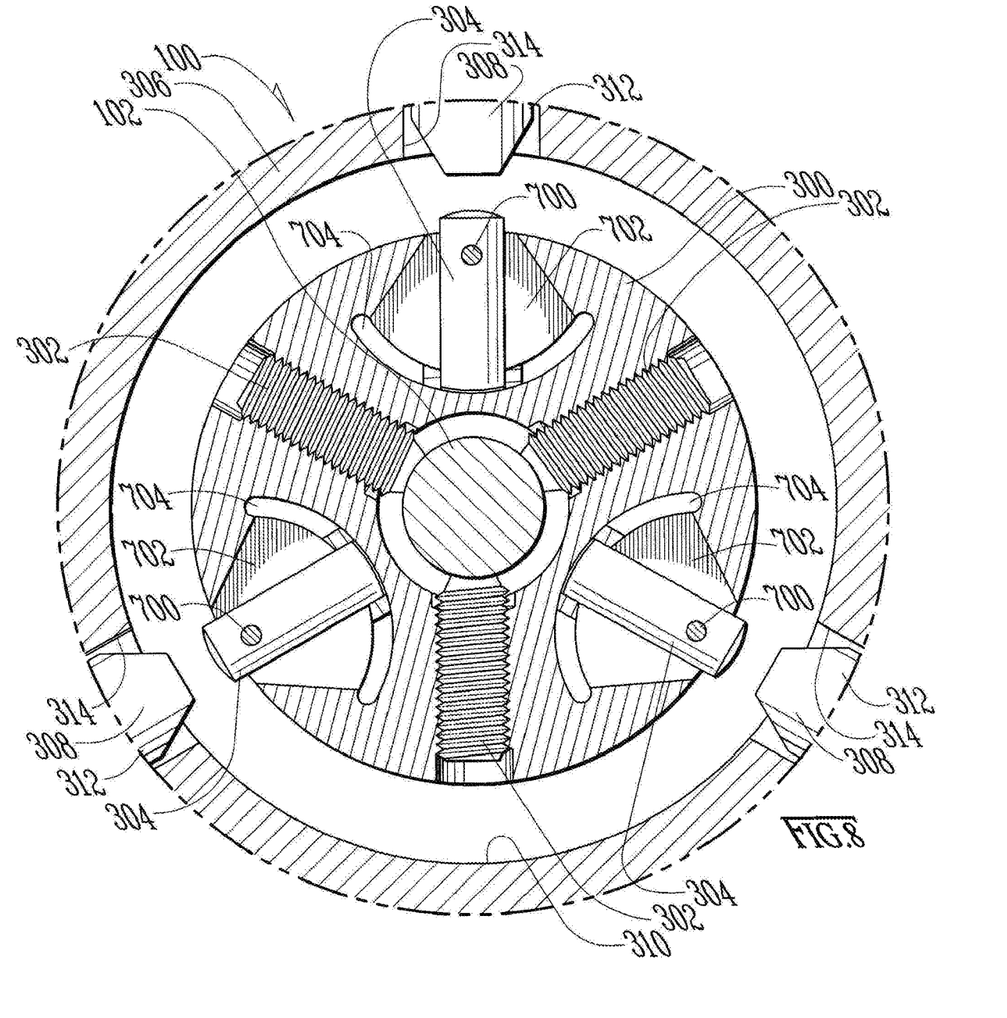
FIG. 8 is a cross-sectional view of a portion of an alternative embodiment of the inventive anti-lock device.
Figure 9:
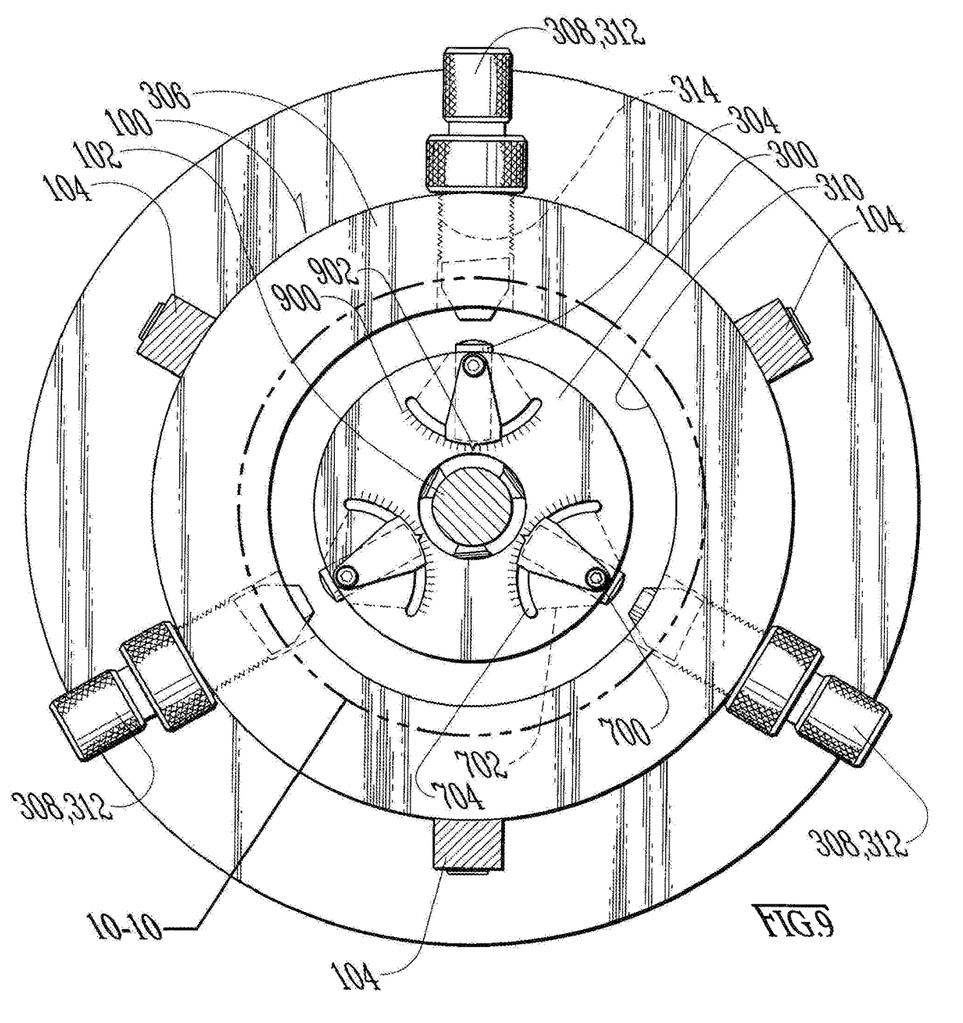
FIG. 9 is a cross-sectional view of an alternative embodiment of the inventive anti-lock device.
Figure 10:
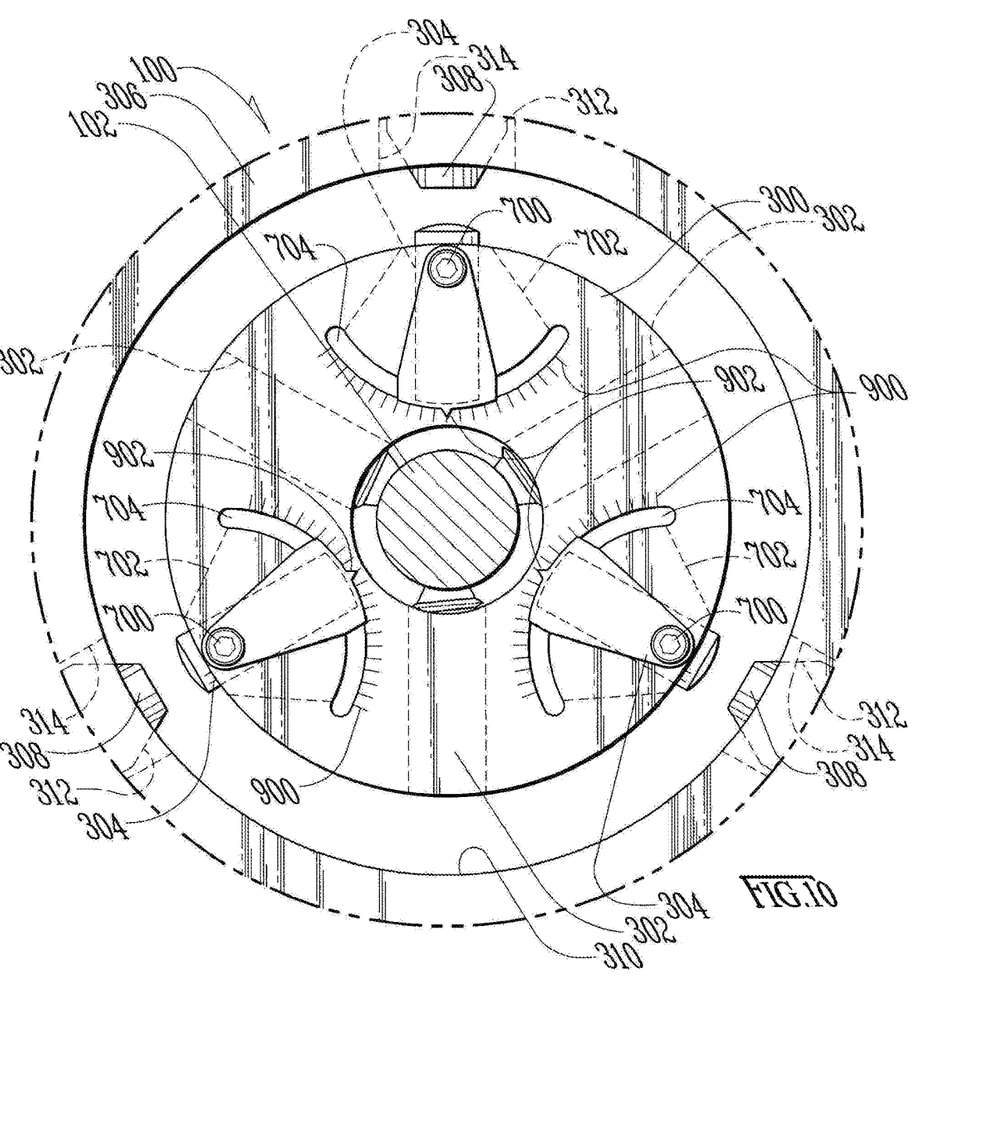
FIG. 10 is a cross-sectional view of a portion of an alternative embodiment of the inventive anti-lock device.

Referring now to FIGS. 7 and 8, cross-sectional views of an alternative embodiment are depicted. The alternative embodiment is similar to the previously described embodiment, with the additional of a means of adjustment of the inner magnets 304. In this embodiment, inner magnets 304 are pivotally attached to the inner ring 300 by a pin 700. The chamber 702 in which the inner magnets 304 are disposed have arcuate inner surfaces 704 to allow the inner magnets 704 to pivot around pin 700. FIGS. 9 and 10 depict an embodiment of adjustment scales 900 that may be used to adjust the angle of inner magnets 304 with respect to the inner ring 300. The indicator 902 moves in alignment with inner magnet 304 to indicate the alignment of magnet 302 to the user of the device 100.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed is:

1. An anti-lock device for a rotating shaft comprising:
at least one inner magnet attached to the rotating shaft;
at least one outer magnet held in a fixed position relative to the rotating shaft;
wherein like poles of the at least one inner magnet and the at least one outer magnet are positioned so that when each of the at least one inner magnet passes by each of the at least one outer magnet on each revolution of the rotating shaft a repulsive force exists between the each of the at least one inner magnet and the at least one outer magnet.

2. The anti-lock device of claim 1 wherein the at least one inner magnet comprises at least three inner magnets and the at least one outer magnet comprises at least three outer magnets.

3. The anti-lock device of claim 1 further comprising:
an inner ring fixed to the rotating shaft;
wherein the at least one inner magnet is attached to the inner ring.

4. The anti-lock device of claim 3 further comprising:
an outer ring having at least one socket;
wherein each of the at least one outer magnet is attached to the outer ring in one of the at least one socket.

5. The anti-lock device of claim 4 wherein each of the at least one outer magnets is adjustably attached to the outer ring to allow the separation between each of the at least one inner magnets and the at least one outer magnets to be adjusted.

6. The anti-lock device of claim 5 wherein an inner end of each of the at least one outer magnets includes a tapered section.

7. The anti-lock device of claim 6 wherein the tapered section comprises a frusto-conical section.

8. The anti-lock device of claim 6 wherein the tapered section comprises opposed bevels aligned with direction of rotation of the at least one inner magnets.

9. The anti-lock device of claim 6 wherein the rotating shaft is the drive shaft of a load device having variable rotational resistance.

10. The anti-lock device of claim 9 wherein the positions of the at least one inner magnets and the at least one outer magnets are selected so that each of the at least one inner magnets is repelled by one of the at least one outer magnets when the variable rotational resistance of the load device is at an increased resistance.

11. The anti-lock device of claim 10 wherein the load device is an electrical generator.

12. The anti-lock device of claim 6 wherein each of the at least one socket is a threaded socket;

and wherein each of the at least one outer magnets is disposed in a threaded member received by one of the at least one threaded socket.

13. The anti-lock device of claim 12 wherein the separation between each of the at least one inner magnets and one of the at least one at least outer magnets may be adjusted by turning the threaded member to advance or retract the threaded member from the threaded socket.

14. The anti-lock device of claim 13 further comprising a threaded locking ring screwed onto the threaded member to secure the threaded member into the threaded socket.

15. The anti-lock device of claim 14 wherein the at least one inner magnets are adjustable, and further comprising an adjustment scale for aligning the at least one inner magnets within the inner ring of the anti-lock device.

16. An anti-lock device for a rotating shaft used to power a load device, the anti-lock device comprising:

an inner ring attached to the rotating shaft such that the inner ring rotates with the rotating shaft;

a first inner magnet, a second inner magnet, and a third inner magnet attached to the inner ring;

a second ring attached to the load device in a fixed relationship to the rotating shaft;

a first outer magnet, a second outer magnet, and a third outer magnet attached to an outer ring;

wherein when the inner ring rotates with the rotating shaft such that like magnetic poles of each of the outer magnets exerts a repulsive force on each of the inner magnets as the inner magnets pass by the outer magnets.

17. The anti-lock device of claim 16 wherein the like magnetic poles of the inner magnets and the outer magnets extend outwardly from the inner ring and inwardly from the outer ring, respectively.

18. The anti-lock device of claim 17 wherein the inner magnets are disposed on the inner ring with the like poles of the inner magnets, respectively, extending outwardly from the shaft and with 120 degrees of arc separation from the other inner magnets.

19. The anti-lock device of claim 18 wherein the outer magnets are disposed on the outer ring with the like poles of the outer magnets, respectively, extending inwardly toward the shaft and with 120 degrees of arc separation from the other outer magnets.

20. The anti-lock device of claim 19 wherein the outer magnets are aligned with the load device such that when one of the outer magnets repels one of the inner magnets, the repulsive force counteracts a portion of a load of the load device.

* * * * *